Patented Feb. 15, 1944

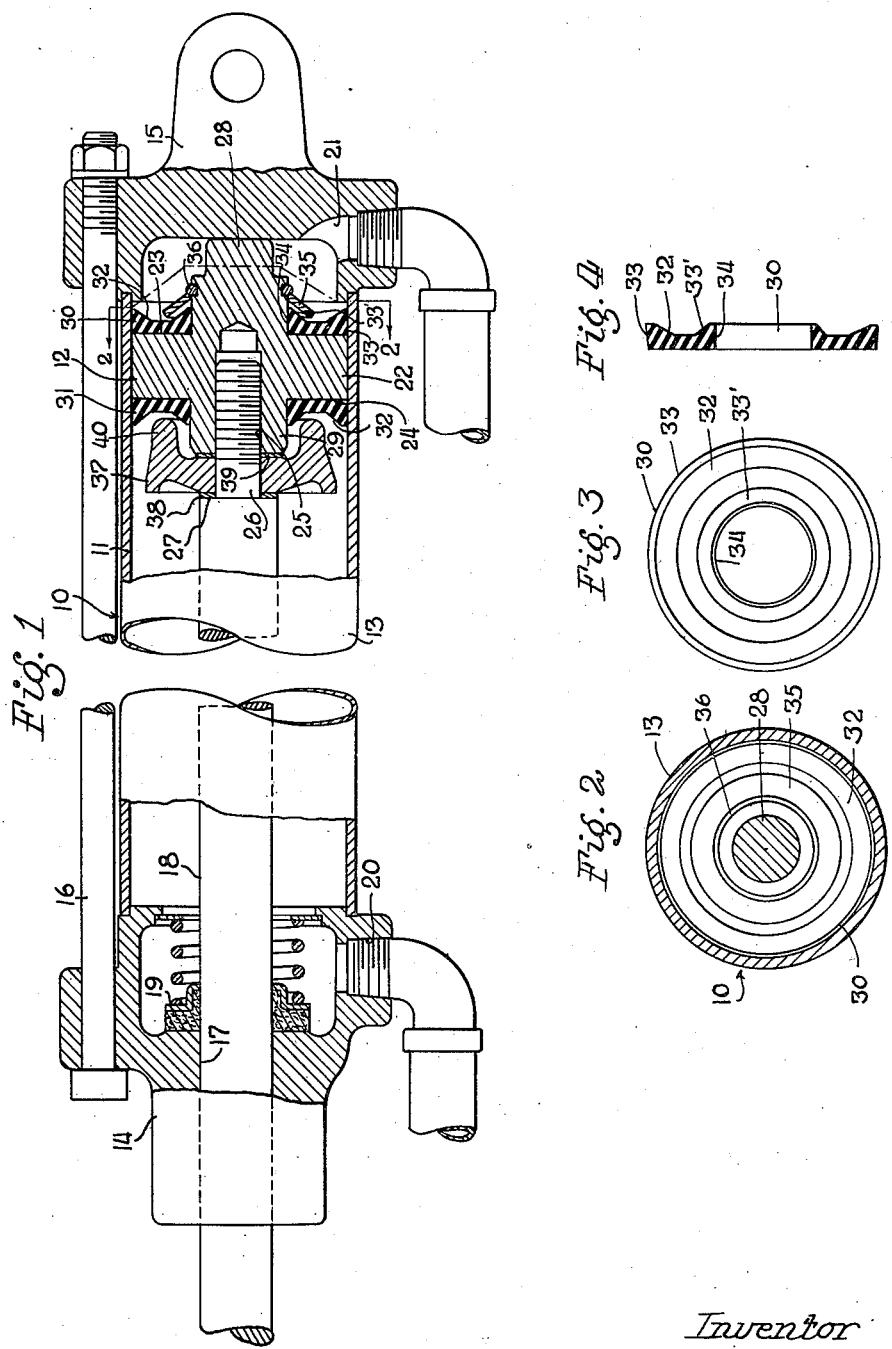

2,341,803

UNITED STATES PATENT OFFICE 2,341,803

FLUID EXPANSIBLE DEVICE

Carl W. Mott, La Grange, Ill., assignor to International Harvester Company, a corporation of New Jersey Application February 12, 1942, Serial No. 430,656

7 Claims. (Cl. 309—4)

This invention relates to fluid expansible devices and more particularly to the piston structure assembly therefor.

It is an object of the present invention to provide a piston structure assembly of minimum parts, wherein the same may be readily assembled.

It is another object of the invention to provide a novel sealing element which does not have to be clamped to the piston body element.

According to the present invention, the piston structure includes a single body element having faces presentable to the fluid pressure within the fluid cylinder or housing in which the piston structure is assembled for movement. A sealing element of a type adapted to be fitted against the faces of the body element, and there retained without the necessity of a clamping means, is provided on the body element. This sealing element, while the piston structure is in use and fluid is provided in the fluid cylinder device, is retained in its fitted position on the body element wholly by fluid pressure from the fluid within the fluid cylinder. Since there is always a certain amount of fluid at all times within the fluid cylinder device and the sealing element is so designed and arranged to fit against the faces of the body element, no clamping means is necessary at this time. In order that the piston structure can be readily assembled within the fluid cylinder without effecting separation of the novel sealing elements, there is provided a limiting means, but this limiting means is not depended upon for the holding of the sealing element at any other time or when the fluid expansible device is in use and fluid is present within the device.

For other objects and for a better understanding of the invention reference may be had to the following detailed description taken in connection with the accompanying drawing, in which:

Figure 1 is a side elevational view of a fluid expansible device, partly in full and partly in section, having a piston structure embodying the features of the present invention associated therewith;

Figure 2 is a view taken along the line 2—2 of Figure 1 and looking toward one end of the piston structure;

Figure 3 is a plan view of the sealing element; and

Figure 4 is a view in section of the sealing element.

Referring now to the figures, there is shown generally a fluid expansible device 10 having a fluid housing or cylinder assembly 11 and a piston structure 12. The fluid cylinder assembly includes a fluid cylinder or tube 13 on the respective ends of which are secured head members 14 and 15 by means of elongated securing bolts 16.

The head member 14 has an opening 17 through which the piston rod 18, secured to and forming a part of the piston structure 12, telescopes. This head member 14 also has associated with it a sealing means 19 adapted to prevent leakage of fluid about the piston rod 18 and through the opening 17 in the head member 14. This fluid expansible device is, as shown, of the double-acting type, and the head members 14 and 15 have respectively the inlet passageways 20 and 21.

The piston structure 12 includes a body element 22 having faces 23 and 24 on opposite sides of the same. Within this body element 23 is a threaded opening 25 adapted to be screwed over a threaded portion 26 on the piston rod 18. This threaded portion 26 is of less diameter than the diameter of the piston rod proper, and thus there is provided a shoulder 27 on the piston rod 18.

Extending from the face 23 of the body element 22 is an axial extended portion 28 adapted to abut the cylinder head 15 as the piston structure moves to the end of its stroke in that direction. On the opposite side of the body element 22 is a similar axially extended portion 29 through which the threaded opening 25 passes. It will be noted that these faces 23 and 24 are of annular shape and are adapted to have respectively fitted against the same, sealing elements 30 and 31.

Each of these sealing elements is made of a flexible material, such as of synthetic rubber, and is provided with a face adapted to fit securely with the faces of the body element 22. The opposite faces of the sealing elements are grooved, as indicated at 32, to give a certain amount of radial movement to a peripheral portion 33 and to a portion 33'. As seen in Figure 4, it will be noted that the portion 33 is flared somewhat outwardly, as when the sealing element is free of the confines of the cylinder 13. When the sealing element is, however, assembled to the body element, the portion 33 is compressed and its peripheral face will be flush with the cylinder wall. By so forming the sealing element in this manner, the desired wiping effect of the sealing element is accomplished. Each sealing element has an opening 34 adjacent the portion 33' adapted to fit over the axially extended portions on the body element. The wall of the opening 34 may offer some frictional resistance to movement of the sealing element on the axially extending portion, but this need not be necessary for the retaining of the sealing element on the body element. Fluid pressure on the portion 33' will cause the same to move radially inwardly to insure proper sealing for the fluid about the axially extended portion of the piston over which the sealing element fits. The sealing element is primarily retained in its fitted position by means of fluid pressure within the fluid expansible device. When fluid is being passed through one of the head members, pressure is pressed up against the sealing element, and it is consequently maintained in its fitted position. When fluid is released from the cylinder device to return to its original source, the return of this fluid is sufficiently restricted as to still maintain a pressure against the sealing element to maintain it in its fitted position.

It is only when the piston structure is assembled or disassembled from the fluid cylinder device 11 that some means need be provided to retain the sealing element on the body element. Thus, on the axially extended portion 28 there is provided a washer 35 and a holding ring 36, neither of which actually contacts the sealing element but they are merely provided in order that the sealing element 30 cannot be fully removed from the axial portion 28 upon being assembled or disassembled from the fluid cylinder 13.

The sealing element 31 is limited in its movement upon the piston structure being assembled or disassembled from the cylinder 13 by means of a ring element 37 assembled on the threaded portion 26 of the piston rod and retained there by the screwing down of the body element 22 over the threaded portion 26. Once the sealing elements 30 and 31 are put in place on the body element 22, this screwing of the body element on the threaded portion 36 of the piston rod to bear against the ring element 37 is the only operation necessary for completing the assembly of the piston structure. Washers 38 and 39 may be provided on the threaded portion at opposite sides of the ring element 37. It will be noted that this ring element 37 has a forwardly projected portion 40 which extends sufficiently forward to lie within the groove 22 of the sealing element 31 but not in engagement with the same. This ring element thus serves only to limit the movement of the sealing element 31 upon the piston structure being assembled or disassembled from the cylinder 13.

Natural rubber has the property of swelling or intumescing when subjected to the oil commonly used as the pressure transmitting medium in pumps or motors as 10. This property is also possessed more or less by the synthetic rubbers to a degree determined by their constituents and processing. If the outer ends of the sealing members 30 and 31 are left untrammelled during the swelling period, there is a bulging or displacement of the material into their grooves 32, which displaced material reacts radially outwardly and thus maintains the outer peripheral portions 33 in engagement with the cylinder wall throughout their entire axial length. Contrarily, if the outer faces of the members 30 and 31 are confined against this bulging, skin tension forces are developed which pull radially inwardly upon the outer ends of the cylinder-wiping peripheral portions 33, pulling these ends away from the cylinder wall and consequently impairing the effectiveness of these sealing members. Therefore, the parts 35 and 40 are spaced from the outer faces of the sealing members to provide adequate space into which the aforesaid bulging can occur.

It should now be apparent that there has been provided a piston structure which is of simple construction and one which can be readily assembled. It should also be apparent that there has been provided a novel sealing element which is retained on the body element of the piston structure primarily by means of the fluid pressure within the fluid expansible device and wherein the usual clamping means necessary for the retaining of sealing elements of the type used heretofore is eliminated.

While various changes and modifications may be made in the detail construction, it shall be understood that such changes shall be within the spirit and scope of the present invention as defined by the appended claims.

What is claimed is:

1. In a fluid expansible device, a fluid cylinder having a cylinder wall, a piston structure within the fluid cylinder, said piston structure including a body element filling a portion of the cylinder, said body element having an end face subjectable to fluid pressure and a diminished diameter portion extending axially from said end face, a sealing element of intumescent material carried axially slidably on said piston structure for wiping the cylinder wall and so constructed as to fit around the axially extending portion and positively against the face of the body element to be retained there when in use wholly by the fluid pressure within the fluid cylinder, and sealing element retaining means secured on the axially extended portion in axially spaced relation with the sealing element to provide space between said retaining means and said element for subsequent bulging of the latter, and said retaining means having a section projecting radially outwardly from its mounting on the extending portion of the body and projecting axially toward the sealing element to provide a stop spaced therefrom for limiting the movement of the sealing element on the body element upon the fluid pressure being released, whereby said piston structure may be assembled or disassembled from the fluid cylinder without incurring the contingency of accidental disassociation of the sealing element from the body element.

2. In a fluid cylinder device, a fluid cylinder structure having a cylinder wall, a piston structure including a piston rod extending through one end of the cylinder structure and having a narrow threaded end portion and a shoulder portion, a body element adapted to be attached to the threaded end portion of the piston rod and having a face subjectable to fluid pressure within the fluid cylinder structure, a sealing element of intumescent material for wiping the cylinder wall fitted against the face of the body element and adapted to be so retained by the fluid within the fluid cylinder structure, and means for limiting movement of the sealing element with respect to the body element when fluid pressure is released within the fluid cylinder structure whereby the piston structure may be assembled or disassembled from the fluid cylinder structure without the sealing element being separated from the body element, said limiting means including a ring-like element fitted over the threaded end portion of the piston rod and retained against the shoulder portion thereof when the body element is attached to the piston rod, said ring-like element having a circular projection extended to a location near to but out of contact with the sealing element.

3. In a piston, the combination of a piston body having an end projection and an annular end face about such projection, an annular sealing member of intumescent material disposed axially slidably upon and about said projection and having an end face conforming to and in opposed contiguity with the annular face of said body, said sealing member also having an outer peripheral cylinder-wiping surface and an opposite end face portion bulgable axially outwardly into an adjacent space to preserve the desired contour of said cylinder-wiping surface pursuant to intumescence of said sealing member, and means upon said end projection out of contact with said sealing member to provide for the axial sliding of said member and having a section spaced radially outwardly from said projection into axial registry with said opposite end face portion of the sealing member and externally of said space to avoid closing of said space though abuttable against said end face portion of the sealing member to limit the distance the sealing member can slide in one direction.

4. In a piston, the combination of a piston body having a pressure-receiving end face, a sealing member of intumescent material having opposite end faces of which one is fitted conformingly onto said body end face, said sealing member also having an outer peripheral cylinder-wiping portion and a recessed portion of annular formation within its other end face substantially coaxial with said cylinder-wiping portion and which is adapted to bulge axially outwardly into space embraced thereby for preserving the desired formation of said cylinder-wiping portion pursuant to intumescence of the sealing member, and retaining means upon said body and comprising a portion disposed in slight axially spaced relation with said outer face of the sealing member to avoid substantial trammeling of such bulging while serving as an abutment to preclude disassociation of said member from the piston body.

5. In a piston, the combination of a piston body having a pressure-receiving end face, a sealing member of intumescent material having opposite end faces of which one is fitted conformingly onto said body end face, said sealing member also having an outer peripheral cylinder-wiping portion and a recessed portion of annular formation within its other end face substantially coaxial with said cylinder-wiping portion and which is adapted to bulge axially outwardly into space embraced thereby for preserving the desired formation of said cylinder-wiping portion pursuant to intumescence of the sealing member, and retaining means upon said body exteriorly of said space in axially opposed spaced relation with said recessed portion for reaction thereon to preclude axial displacement of said member from said body.

6. In a piston, the combination of a piston body having an end projection and an annular end face about such projection, an annular sealing member of intumescent material disposed upon and about said projection and having opposite inner and outer end faces of which the inner face is fitted contiguously with the annular end face of said body, said sealing member also having an outer peripheral cylinder-wiping portion projecting axially from the outer face and an inner peripheral portion projecting axially from said outer face to define, with said cylinder-wiping portion, an annular space outwardly from said outer face into which the latter is displaceable pursuant to intumescence of the sealing member to cause the displaced material to react between the axially projecting peripheral portions for preserving a desired contour of the cylinder-wiping portion, and means upon said end projection in slight axially spaced relation with the portion of said outer end face between said cylinder-wiping portion and said inner axially projecting peripheral portion and abuttable by said face to preclude axial removal of said member from said projecting end portion.

7. In a fluid expansible device, a fluid housing having a housing wall, a piston structure within the fluid housing, said piston structure including a body element filling a portion of the fluid housing and having a face presentable to fluid pressure within the housing, a sealing element carried axially slidably on said body element for wiping the housing wall and so constructed as to fit against the face of the body element and to be retained in its fitted position when in use by the fluid pressure within the fluid housing, said sealing element being made of a material in which swelling is normally incurred subsequent to its assembly with said body element, and sealing element retaining means on the body element in slight axially spaced relation from the sealing element to provide for said sliding of the sealing element and also to provide space into which said element can axially bulge incident to the aforesaid swelling, said sealing element retaining means having a section projecting radially outwardly from its mounting on the body element and toward the sealing element though spaced therefrom for engagement therewith to prevent accidental separation thereof from said body element as during relative movement of said body element and said housing in the absence of such fluid pressure.

CARL W. MOTT.